United States Patent [19]

Shekar

[11] 4,031,715
[45] June 28, 1977

[54] FLEXIBLE COUPLING ASSEMBLY

[75] Inventor: Hiriyur V. Shekar, Louisville, Ky.

[73] Assignee: General Electric Company, Louisville, Ky.

[22] Filed: Dec. 12, 1975

[21] Appl. No.: 639,992

[52] U.S. Cl. .............................. 64/15 B; 64/1 V; 64/12; 24/279; 403/321
[51] Int. Cl.² .................................................. F16D 3/52
[58] Field of Search ................ 64/15 R, 15 B, 1 V, 64/12; 403/321; 74/472, 473; 24/279

[56] References Cited
UNITED STATES PATENTS

| | | | |
|---|---|---|---|
| 1,369,349 | 2/1921 | Murphy | 64/15 B |
| 2,625,721 | 1/1953 | Lockhart | 24/279 |
| 2,968,169 | 1/1961 | Davis | 64/15 B |
| 3,611,750 | 10/1971 | Gaslor | 64/15 R |
| 3,879,811 | 4/1975 | Leverton | 24/279 |
| 3,901,046 | 8/1975 | Hofman | 64/1 V |

FOREIGN PATENTS OR APPLICATIONS 389,907  3/1933  United Kingdom ................ 64/15 B

*Primary Examiner*—Samuel Scott
*Assistant Examiner*—Randall Heald
*Attorney, Agent, or Firm*—Frederick P. Weidner; Francis H. Boos

[57] ABSTRACT

An improved flexible coupling assembly for connecting a driving member to a driven member and includes two spaced circular end plates, one for securing to the driving member and one for securing to the driven member, the end plates being interconnected by a one-piece flexible plastic molded body having a plurality of bowed ribs which compensates for axial and lateral displacement between the end plates.

6 Claims, 5 Drawing Figures

FLEXIBLE COUPLING ASSEMBLY

BACKGROUND OF THE INVENTION

1. Field of the Invention

This invention relates to an improved flexible coupling assembly and more particularly to an improved flexible coupling assembly used in an automatic clothes washing machine.

2. Description of the Prior Art

Automatic clothes washing machines customarily proceed through a sequence of operations or cycles in order to wash, rinse and spin dry clothes. The sequence ordinarily includes a washing operation and a liquid extraction operation. These machines have a stationary tub, a clothes retaining basket, and a vertical axis vaned agitator. During the washing operation the agitator oscillates back and forth while the clothes retaining basket is prevented from movement. This action provides for turning over the clothes in the washing liquid for effecting the wash operation. In the liquid extraction operation the basket and agitator are rotated or spun in unison at high speed to extract liquid from the clothes by centrifugal force. During the washing operation a pump constantly recirculates the washing liquid through a filter to remove lint and other contaminants. During the liquid extraction operation the pump operates to remove the washing liquid from the machine.

It is desirable that all of the aforementioned driven operations be accomplished by a single motor in the machine. To this end there is a transmission for providing oscillation of the agitator during the washing operation and rotation of the basket and agitator during the liquid extraction operation. Usually the transmission is driven by an endless belt which in turn is driven by a reversible electric motor through a clutch mechanism. The connection or coupling between the motor and the pump must be flexible to accommodate the various positions that the motor may assume relative to the pump both axially and laterally. Flexible couplings were provided heretofore, however, they were more expensive to manufacture as they had additional component parts and more difficult to assemble thus increasing the labor costs.

By my invention I have improved the prior art flexible coupling assembly in that I have provided a less expensive coupling assembly which is more easily assembled yet accomplishes the same desirable results.

SUMMARY OF THE INVENTION

This invention relates to a flexible coupling assembly for connecting a driving member to a driven member and includes a first circular end plate for attachment to the driving member for rotation therewith and a second circular end plate spaced from the first end plate for attachment to the driven member for rotation therewith, the first and second end plates each having a circular flat surface and at least one lug extending beyond the flat surface. There is provided a one-piece flexible plastic molded body having a collar portion at each end engaging the circular flat surface of the first and second end plates, respectively, and having a notched area to receive the respective lugs. Each of the collar portions has two bosses for receiving fastening means to secure the collars to the first and second end plates respectively. Between and integrally interconnecting the collar portions are a plurality of spaced outwardly bowed ribs. Provided also is a fastening means holding the two bosses of each collar portion together to thereby secure the molded body to the first and second end plates.

This invention relates to utilizing in such a flexible coupling assembly a plastic molded body having at least one molded in protruberance on each collar portion opposite the two bosses and fastening means with the protruberance being substantially the same weight as the bosses and fastening means to act as counterbalance weights during rotation of the flexible coupling assembly.

DESCRIPTION OF THE PREFERRED EMBODIMENT

Figure 1:
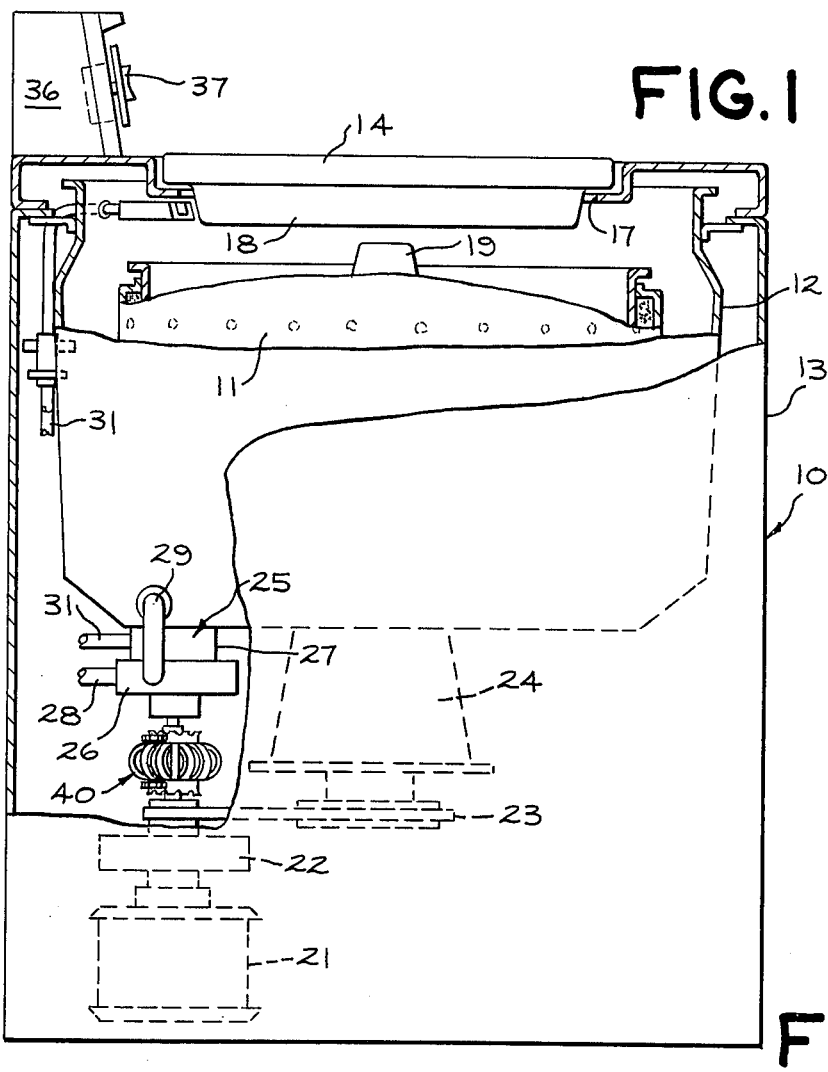
FIG. 1 is a schematic side elevational view of a clothes washing machine incorporating my improved flexible coupling assembly, the view being partly broken away and partly in section.

Referring now to FIG. 1, there is shown a washing machine 10 having a conventional perforated wash basket 11 disposed within an outer imperforate, stationary liquid retaining tub 12. With this combination, the basket 11 and tub 12 from suitable means for containing liquid and the fabrics to be washed in said liquid. The outer tub 12 is rigidly mounted within an appearance cabinet 13 which includes an access cover or lid 14 mounted by hinges (not shown) on the top portion of the cabinet for providing access through an opening 17 to the basket 11.

Shown positioned over the basket 11 and projecting into the opening 17 is a wash water treating agent dispenser 18. At the center of the wash basket 11 there is positioned an agitator 19 which is mounted for oscillatory motion which acts to turn over the fabrics during the washing operation. The basket 11 is mounted for high speed rotation along with the agitator 19 for extracting liquid from the clothes by centrifugal force.

Basket 11 and agitator 19 are driven by a reversible motor 21 through a drive mechanism including a clutch 22 which through a suitable belt 23 transmits power to a transmission 24. When the motor 21 is rotated in one direction the transmission causes a slow speed oscillation of the agitator 19 for the washing operation. Conversely, when the motor is driven in the opposite direction the transmission drives both the basket 11 and agitator 19 in unison at high speed for centrifugal extraction of the liquid from the fabrics within the basket.

In addition to operating the transmission 24 as described, motor 21 also provides a direct drive to a pump mechanism 25 that includes separate pumping units 26 and 27. The flexible coupling assembly 40 of this invention is specifically for use between the motor 21 (driving member) and the pump mechanism 25 (driven member). During the high speed liquid extraction operation, pump unit 26 draws liquid from the outer tub 12 through conduit 29 and discharges it through conduit 28. During the washing operation pump unit 27 draws liquid from the tub and discharges it through conduit 31. Conduit 31 extends up and terminates in the tub wall and directs liquid flow into the dispenser 18 or a filter pan (not shown) and then into the basket 11.

Mounted on the cabinet 13 is a control compartment 36 in which are located control devices, including a cycle controller 37 which conducts the washing machine through cycles of operation.

Figure 2:
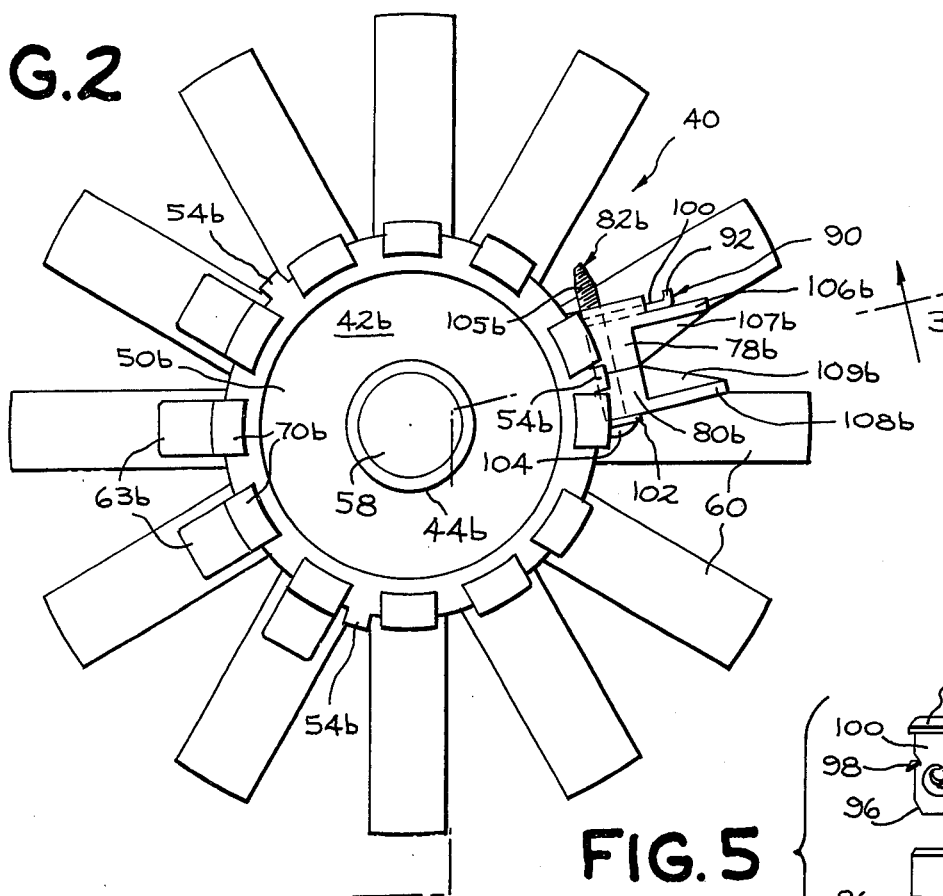
FIG. 2 is a top plan view of the improved flexible coupling assembly.
Figure 5:
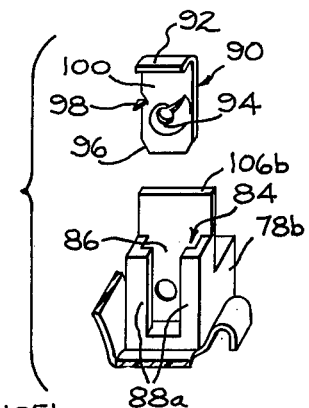
FIG. 5 is a perspective view of a portion of the improved flexible coupling assembly showing part of the fastening means.
Figure 3:
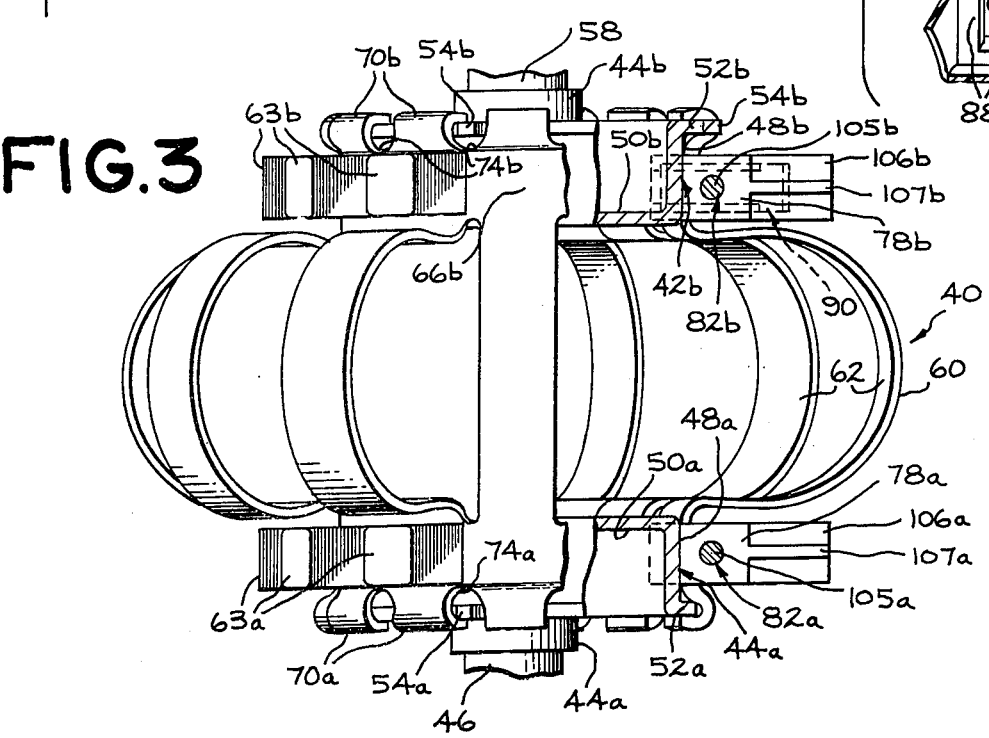
FIG. 3 is a fragmentary sectional view taken along lines 3—3 of FIG. 2.

With reference to FIGS. 2 and 3 in particular, the flexible coupling assembly 40 is shown completely assembled. The flexible coupling assembly 40 includes two identical end plates so the respective components will have the same number identification but with $a$ and $b$ suffices. The end plates 42$a$ and 42$b$ which may be of cast metal each have a central hub 44$a$ and 44$b$. Hub 44$a$ is for securement by any suitable means to a driving member 46 such as a shaft or shaft extension of the reversible electric motor 21. Hub 44$b$ of end plate 42$b$ is secured by any suitable means to a driven member 58 such as the rotational central axle of the pump 25. The end plates 42$a$ and 42$b$ have a circular flat surface or collar portions 48$a$ and 48$b$ at right angles to the horizontal disc portion 50$a$ and 50$b$ that interconnects the circular flat surfaces 48$a$ and 48$b$ and the central hubs 44$a$ and 44$b$, respectively. The collar portions 48$a$ and 48$b$ terminate in radially outwardly directed flanges 52$a$ and 52$b$ which flanges have further extensions of at least one lug 54$a$ and 54$b$ and preferably three lugs equally spaced around the periphery of flanges 52$a$ and 52$b$, the function of which will be explained later.

Figure 4:
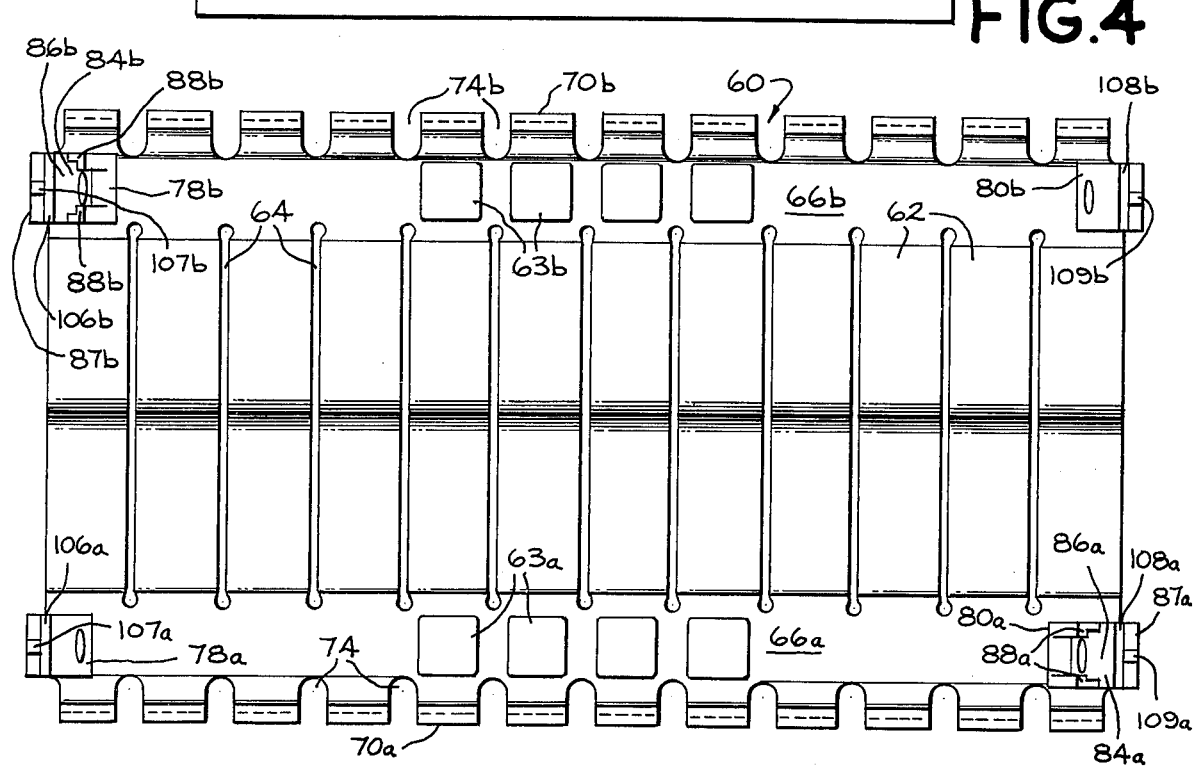
FIG. 4 is a plan view of a portion of the improved flexible coupling assembly.

Interconnecting the first circular end plate 42$a$ and the second circular end plate 42$b$ is a one piece flexible plastic molded body 60 which is shown in its molded form prior to assembly in FIG. 4. The plastic molded body 60 includes a plurality of bowed ribs 62 which are slightly thinner at their middle portion relative to the outer portions. The ribs 62 are provided by making slits 64 in the one piece molded body 60 during its manufacture. Also during manufacture, the mold provides for two flat surfaces 66$a$ and 66$b$ located respectively along each side of the molded body outwardly of the ribs 62. During molding of the one piece plastic molded body 60 the collar portions 66$a$ and 66$b$ are provided at the ends thereof with bosses 78$a$ and 78$b$ at one end and bosses 80$a$ and 80$b$ at the other, which bosses are for receiving fastening means such as screws 82$a$ and 82$b$ therethrough to secure one end of the collars to the other during assembly. At the longitudinal edges of the plastic molded body there is provided a hook or U-shaped portion 70$a$ and 70$b$ with equally spaced notches 74$a$ and 74$b$ respectively. Also during molding the two flat surfaces 66$a$ and 66$b$ each having integrally molded therein at least one protruberance 63$a$ and 63$b$. As shown in the drawings, the preferred embodiment has four such protruberances located at the center portion of the molded body 60 with particular reference to FIG. 4. The protruberances 63$a$ and 63$b$ are preferably located adjacent the ribs 62 and not the slits 64. This arrangement allows the flexible plastic molded body 60 to be more easily flexed as the bending of the flat surfaces 66$a$ and 66$b$ readily occurs in that area between the end of the slit 64 and the notches 74$a$ and 74$b$. Should the protruberances 63$a$ and 63$b$ be located between the slits and the notches, then the bending would be inhibited. The protruberances 63$a$ and 63$b$ should have a cumulative weight substantially the same as the weight of the bosses 78$a$ and 80$a$ and 78$b$ and 80$b$ together with the fastening means. The reason for the protruberances 63$a$ and 63$b$ is that they act as counterbalance weight during the rotation of the flexible coupling assembly. Ideally, the protruberances would be located diametrically opposite the bosses and fastening means once the flexible coupling assembly has been assembled.

One of the plastic materials from which the one piece plastic molded body 60 is formed that has been found suitable in the preferred embodiment of the invention is a blend of polypropylene and a thermoplastic rubber. The thermoplastic rubber is a block copolymer of styrene and olefin rubber. The polystyrene and polyolefin rubber are present in a regular block arrangement of the A-B-A type, where "A" represents the thermoplastic or polystyrene segments and "B" represents the rubber or polyolefin rubber segment. Such thermoplastic rubbers are sold by a number of chemical companies. Shell Chemical Company for intance sells the thermoplastic rubber by the name Kraton G. The blend of polypropylene to the thermoplastic rubber compound will depend upon the desired flexibility and strength characteristics of the plastic molded body for the environment in which it will be used. in the flexible coupling assembly shown and described above in Applicant's washing machine equal amounts by weight of polypropylene and Kraton G rubber have been found to be quite satisfactory.

The one piece plastic molded body 60 shown in FIG. 4 and described above is secured to the two circular end plates 42$a$ and 42$b$ by wrapping the flat surfaces 66$a$ and 66$b$ around and in contact with the respective collar portions 48$a$ and 48$b$ while the U-shaped portions 70$a$ and 70$b$ interface with the flanges 52$a$ and 52$b$. The notches 74$a$ and 74$b$ are provided so that the three equally spaced lugs 54 may be received therein. These lugs then prevent relative motion between the end plates 42$a$ and 42$b$ and the flat surfaces 66$a$ and 66$b$ of the molded plastic body 60.

Either before or after the assembly of the flexible coupling the end plates 42$a$ and 42$b$ are secured respectively to the driving member 46 and the driven member 58. It can be seen that the coupling assembly is quite flexible due to the outwardly bowed ribs 62 located between the end plates 42$a$ and 42$b$ which compensate for any axial displacement between the end plates and also any lateral displacement by providing the ribs with a thinner center portion, the flexing of the molded body primarily occurs in that area thus reducing the strain on the plastic ribs where they join the flat surfaces 66$a$ and 66$b$.

Securing the molded plastic body 60 to the end plates 42$a$ and 42$b$ during manufacture of the flexible coupling assembly is facilitated by the particular arrangement and structure of the bosses 78$a$ and 78$b$ and 80$a$ and 80$b$. The securing will now be described with particular reference to FIGS. 2–5. Securement is achieved by the abuttment of bosses 78$a$ and 78$b$ to bosses 80$a$ and 80$b$ respectively as shown particularly in FIG. 2. One boss of each of these sets has integrally molded therein a rectangular shaped pocket 84$a$ and 84$b$ formed by one surface 86$a$ and 86$b$ of the boss opposite the abutment side 87$a$ and 87$b$. The surface 86$a$ and 86$b$ has integrally molded therewith spaced track members 88$a$ and 88$b$ which terminate at the flat surfaces 66$a$ and 66$b$ respectively. The pocket 84$a$ and 84$b$ receive therein a rectangular shaped reinforcing fastening member 90 made of sheet metal with an outwardly turned flange 92 and having a thread receiving aperature 94 in the center thereof. Preferably in order to have the pocket 84a and 84b readily receive the reinforcing fastening member 90 the end opposite end flange 92 has beveled edges 96. To more readily retain the reinforcing member 90 in pocket a barb 98, which departs the plane surface 100 of the reinforced fastening member 90, is formed so that it will dig into the track members 88a and 88b thus tending to retain the fastening member in the pocket 84a and 84b. All of the bosses 78a and 78b and 80a and 80b have apertures therethrough to facilitate insertion of a screw 82a and 82b. It will be noted that these screws have a washer 102 preferably integrally formed between the head 104 and threaded shank 105 of the screw and serve the purpose of reinforcing the position of the screw relative to the plastic bosses. At the opposite end of the threaded shank 105 of the screw is received in the aperture 94 of the reinforcing fastening member 90.

Extending outwardly from the bosses are tab extensions 106a and 106b at one end and 108a and 108b at the opposite end. The tab extension have reinforcing ribs 107a and 107b and 109a and 109b to help prevent too much flexing. When the flexible coupling is assembled these tab extensions are spaced from each other as shown specifically in FIG. 2. These tab extensions 106a and 106b and 108a and 108b are for the person doing the assembling to obtain finger purchase of the parts to draw them together with one hand so that the other hand may use a screw driver to manipulate the screws 82a and 82b through the bosses and the reinforced fastening member 90 and tighten the screw against the fastening member to draw the bosses together in abuttment and secure the plastic molded body 60 to the end plates 42a and 42b.

The foregoing is a description of the preferred embodiment of the invention and variations may be made thereto without departing from the true spirit of the invention, as defined in the appended claims.

What is claimed is:

1. A flexible coupling assembly for connecting a driving member to a driven member comprising:
    a. a first circular end plate for attachment to the driving member for rotation therewith,
    b. a second circular end plate spaced from the first end plate for attachment to the driven member for rotation therewith, said first and second end plates each having a circular flat surface and at least one lug extending beyond the flat surface,
    c. a one-piece flexible plastic molded body having (i) a collar portion at each end engaging the circular flat surface of the first and second end plates respectively, said collar portions each having two bosses for receiving fastening means to secure the collars to the first and second end plates respectively, (ii) a notched area to receive the respective lugs, and (iii) a plurality of spaced outwardly bowed ribs interconnecting the collar portions and spanning the space between the first and second end plates,
    d. fastening means holding the two bosses of each collar portion together to thereby secure the molded body to the first and second end plates,
    the improvement comprising one of the two bosses on each collar portion having a pocket to receive a reinforcing fastening member.

2. The flexible coupling assembly of claim 1 wherein the bosses have tab extensions to facilitate finger purchase during assembly of the flexible coupling assembly.

3. The flexible coupling assembly of claim 1 wherein the pocket is molded in and rectangular in shape and the reinforcing fastening member is rectangular and slidably received in the pocket.

4. The flexible coupling assembly of claim 1 wherein all of the bosses have apertures to receive a screw therethrough which screw is subsequently gripped by the reinforcing fastening member.

5. The flexible coupling assembly of claim 2 wherein the bosses are formed so that the two bosses on each collar portion abut each other and the tab extensions thereon are spaced from each other.

6. The flexible coupling assembly of claim 1 wherein the plastic molded body has at least one molded in protruberance on each roller portion opposite the two bosses and fastening means, said protruberance being substantially the same weight as the bosses and fastening means.

* * * * *